UNITED STATES PATENT OFFICE.

WILLIAM GEORGE ANDREWS, OF CHICAGO, ILLINOIS, ASSIGNOR TO ANDREWS MILLING COMPANY, OF CHICAGO, ILLINOIS, A CORPORATION OF ILLINOIS.

COMPOUND FOR ACCELERATING FERMENTATION.

1,063,177.  Specification of Letters Patent.  Patented June 3, 1913.

No Drawing.  Application filed August 23, 1912. Serial No. 716,766.

*To all whom it may concern:*

Be it known that I, WILLIAM GEORGE ANDREWS, a citizen of the United States, residing at Chicago, in the county of Cook and State of Illinois, have invented new and useful Improvements in Compounds for Accelerating Fermentation, of which the following is a full, clear, concise, and exact description.

My invention relates to a compound for accelerating fermentation and is intended to take the place of malt extract, sugar and a portion of the yeast in commercial bread-making.

In making bread in quantities in bakeries at the present time malt extract is mixed with the dough to afford a food for the yeast and to transform the starch of the flour to sugar, thus accelerating the fermentation. Commercial malt extract is in the form of a thick syrup, and is thus objectionable because of the difficulty in handling and mixing it.

One of the objects of my invention is to provide a compound which shall be in the form of a powder and therefore can be readily handled, and which while having all the advantages of malt extract will possess certain advantages thereover and be free from the disadvantages incident to the use of malt extract.

The compound of the present invention consists of a material which contains starch-converting enzym, combined with a material containing soluble nitrogenous and phosphatic bodies in considerable quantities, and a starch product in which substantially all of the starch granules have been modified or ruptured to such an extent as to be more readily acted upon by malt diastase than the starch of flour. The last mentioned material acts as a convenient vehicle for the absorption of the other ingredients so that when the three materials are combined and suitably dried a powderlike compound results, and with the latter two materials also acts in a capacity to assist in the fermentation when the compound is used in bread-making.

Describing more specifically for the purpose of illustration ingredients which may be combined to produce my compound, I may use "mazam," yeast extract and malt extract, in such proportions as to form a thick paste when mixed. For example, I may use two parts mazam, to one part yeast extract and one part malt extract. "Mazam" is the name by which the product of Patent No. 855,599, dated June 4, 1907, is known to the trade. These ingredients, in substantially the proportions mentioned, are mixed thoroughly to form a thick paste and this paste when thus formed is dried in a vacuum on a rotary drum or in pans in thin layers until the moisture content is reduced to about ten per cent. The thus dried paste is then reduced to a powderlike form in which form it may be much more conveniently handled than malt extract. The product is then ready for the market and may be put up in any suitable container or receptacle.

In the use of the compound in bread-making the compound is mixed with the flour, water, shortening, yeast, and other ingredients usually used in commercial bread-making. In the dough the starchy material of the compound having substantially all its granules modified or ruptured is readily acted upon by the malt diastase and converted into malt sugar which takes the place of the cane sugar ordinarily used. The ingredient containing soluble nitrogenous and phosphatic bodies, that is, the yeast extract, acts as a yeast food and so accelerates the action of the yeast that only sixty per cent. to seventy per cent. of the normal amount of yeast need be used. The starch converting enzym, that is, the malt diastase, performs the function of the malt diastase present in the malt extract ordinarily used in commercial baking, that is, it converts starch into sugar.

Aside from the fact that commercial malt extract is because of its fluid condition inconvenient to handle, it is a known fact that its keeping qualities are not good because of the decrease in diastatic power which occurs during storage and shipping. The compound of my invention, while it takes the place of malt extract and in addition possesses certain advantages thereover, has the further advantage that its keeping quality as regards diastatic power is markedly superior to that of malt extract.

Having thus described my invention, what I claim as new and desire to secure by Letters Patent, is—

1. A compound in powderlike form to be used in bread making, consisting of a material containing soluble nitrogenous and phosphatic bodies in considerable quantities, a starch product distinguished by having substantially all of the starch granules modified or ruptured to such a degree as to be more readily acted upon by malt diastase than the starch of flour, and a material containing starch-converting enzym.

2. A compound in the form of a powder to be used in bread-making, consisting of a material containing a high percentage of soluble nitrogenous and phosphatic bodies, a starch product distinguished by having all of the starch granules modified or ruptured to such a degree as to be more readily acted upon by malt diastase, and a material of high diastatic power.

In witness whereof, I have hereunto subscribed my name in the presence of two witnesses.

WILLIAM GEORGE ANDREWS.

Witnesses:
 CARL S. MIXER,
 JOS. P. LANDFIELD